(12) United States Patent
Thiruvallur Loganathan et al.

(10) Patent No.: US 12,734,875 B2
(45) Date of Patent: Sep. 15, 2026

(54) HYBRID POWER UNIT AND HYBRID VEHICLE

(71) Applicant: TVS MOTOR COMPANY LIMITED, Chennai (IN)

(72) Inventors: Balasubramanian Thiruvallur Loganathan, Chennai (IN); Lakshmi Narasimhan Varadha Iyengar, Chennai (IN)

(73) Assignee: TVS Motor Company Limited, Chennai (IN)

( * ) Notice: Subject to any disclaimer, the term of this patent is extended or adjusted under 35 U.S.C. 154(b) by 775 days.

(21) Appl. No.: 18/022,028

(22) PCT Filed: Nov. 9, 2020

(86) PCT No.: PCT/IN2020/050944
§ 371 (c)(1),
(2) Date: Feb. 17, 2023

(87) PCT Pub. No.: WO2022/038622
PCT Pub. Date: Feb. 24, 2022

(65) Prior Publication Data

US 2023/0347728 A1 Nov. 2, 2023

(30) Foreign Application Priority Data

Aug. 19, 2020 (IN) ............................ 202041035643

(51) Int. Cl.
*B60K 6/40* (2007.10)
*B60K 6/26* (2007.10)
(Continued)

(52) U.S. Cl.
CPC .................. *B60K 6/40* (2013.01); *B60K 6/26* (2013.01); *B60K 6/28* (2013.01); *B60K 6/383* (2013.01); *B60K 6/387* (2013.01); *B62M 7/02* (2013.01)

(58) Field of Classification Search
CPC .. B60K 6/387; B60K 2006/268; B60K 6/547; B60K 2006/4808; B60K 2006/4825;
(Continued)

(56) References Cited

U.S. PATENT DOCUMENTS 5,765,671 A * 6/1998 Endo ................ H01M 10/4257 192/69.82
6,109,127 A * 8/2000 Liau ...................... B60K 6/383 474/33
(Continued)

FOREIGN PATENT DOCUMENTS

DE 102014009293 A1 12/2015
DE 102016217299 A1 3/2018
(Continued)

OTHER PUBLICATIONS

International Search Report issued in corresponding International Application No. PCT/IN2020/050944, mailed May 12, 2021 (5 pages).

(Continued)

*Primary Examiner* — Timothy Wilhelm
(74) *Attorney, Agent, or Firm* — Osha Bergman Watanabe & Burton LLP

(57) ABSTRACT

A vehicle includes: an engine assembly including a cylinder head, an engine output shaft, and a crankshaft; and an electric motor assembly transversely disposed above a crankcase of the engine assembly. The electric motor assembly includes an electric motor and an electromagnetic clutch mounted coaxially on the electric motor.

11 Claims, 6 Drawing Sheets

(51) Int. Cl.

| | |
|---|---|
| ***B60K 6/28*** | (2007.10) |
| ***B60K 6/383*** | (2007.10) |
| ***B60K 6/387*** | (2007.10) |
| ***B62M 7/02*** | (2006.01) |

(58) Field of Classification Search
CPC .... B60K 2006/4833; B60K 6/48; B60K 6/38; B62M 7/02; B60W 2300/36; B60Y 2200/12; B60Y 2400/423; B60Y 2400/427; Y02T 10/62
See application file for complete search history.

(56) References Cited

U.S. PATENT DOCUMENTS

| | | | | |
|---|---|---|---|---|
| 6,155,366 | A * | 12/2000 | Lin | B60L 50/16 180/230 |
| 6,524,216 | B2 * | 2/2003 | Suzuki | B60K 6/54 903/952 |
| 6,659,910 | B2 * | 12/2003 | Gu | B60K 6/442 474/18 |
| 6,736,227 | B2 * | 5/2004 | Huang | B60K 6/48 903/909 |
| 7,353,895 | B2 * | 4/2008 | Bitsche | F02N 11/04 903/917 |
| 7,431,112 | B2 * | 10/2008 | Masuda | B60K 6/365 180/230 |
| 7,520,351 | B2 * | 4/2009 | Uchisasai | B60W 10/08 180/65.265 |
| 7,658,171 | B1 * | 2/2010 | Odell | F02D 13/0246 123/90.11 |
| 8,424,626 | B2 * | 4/2013 | Nomura | B60K 6/40 180/65.265 |
| 9,381,970 | B2 * | 7/2016 | Marioni | B62M 9/02 |
| 9,469,375 | B2 * | 10/2016 | Nakano | B62M 7/02 |
| 9,499,042 | B2 * | 11/2016 | Barth | B60K 6/48 |
| 9,731,588 | B2 * | 8/2017 | Kaltenbach | B60K 6/547 |
| 9,789,923 | B2 * | 10/2017 | Hanawa | B60K 6/405 |
| 9,879,642 | B2 * | 1/2018 | Kato | F02M 35/10216 |
| 9,909,544 | B2 * | 3/2018 | Watanabe | B62K 19/48 |
| 9,919,756 | B2 * | 3/2018 | Komatsu | B62J 17/00 |
| 10,989,273 | B2 * | 4/2021 | Obrist | F02B 63/04 |
| 11,215,244 | B2 * | 1/2022 | Matsuda | B60W 20/40 |
| 11,383,695 | B2 * | 7/2022 | Matsuda | B60W 10/11 |
| 11,447,001 | B2 * | 9/2022 | Nishiyabu | B60K 6/387 |
| 12,173,677 | B2 * | 12/2024 | Noami | F01L 13/085 |
| 12,434,787 | B2 * | 10/2025 | Nishiyabu | B62M 7/02 |
| 2007/0235235 | A1 * | 10/2007 | Fukami | B62M 23/02 180/65.6 |
| 2010/0236856 | A1 * | 9/2010 | Nomura | B60L 50/16 180/297 |
| 2012/0217075 | A1 * | 8/2012 | Nomura | B60L 15/2009 903/902 |
| 2014/0238758 | A1 * | 8/2014 | Barth | F16H 61/0213 903/917 |
| 2019/0210449 | A1 * | 7/2019 | Schulz | B60K 6/36 |

FOREIGN PATENT DOCUMENTS

| | | |
|---|---|---|
| EP | 1084049 B1 | 7/2003 |
| EP | 2492126 A1 | 8/2012 |

OTHER PUBLICATIONS

Written Opinion issued in corresponding International Application No. PCT/IN2020/050944, mailed May 12, 2021 (7 pages).

* cited by examiner

HYBRID POWER UNIT AND HYBRID VEHICLE

TECHNICAL FIELD

The present subject matter relates to a saddle type vehicle. More particularly, the present subject matter relates a hybrid saddle type vehicle.

BACKGROUND

Conventionally, most of vehicles are propelled by an internal combustion engine which uses fossil fuels as a source of energy. The gases formed by combustion of the fossil fuels within the internal combustion engine are exhausted from such vehicles to the atmosphere, which leads to increased air pollution in the atmosphere.

Presently, in view of the same, electric vehicles are used as a substitute for the vehicles using fossil fuels. However, such vehicles are required to be equipped with energy storage units having a large capacity in order to propel the vehicles through large distances. So, the vehicles typically include one or more battery, a motor and drive train supported on a frame and enclosed in a body, which propels the vehicle through large distances. Further, electric vehicles (EVs) are currently experiencing increasing demand due to the growing price of fossil fuels and undesirable emissions from traditional internal combustion engine vehicles.

BRIEF DESCRIPTION OF THE DRAWINGS

The detailed description is described with reference to a passenger transport layout of a two wheeled vehicle along with the accompanying figures. The same numbers are used throughout the drawings to reference like features and components.

DETAILED DESCRIPTION

Figure 1:
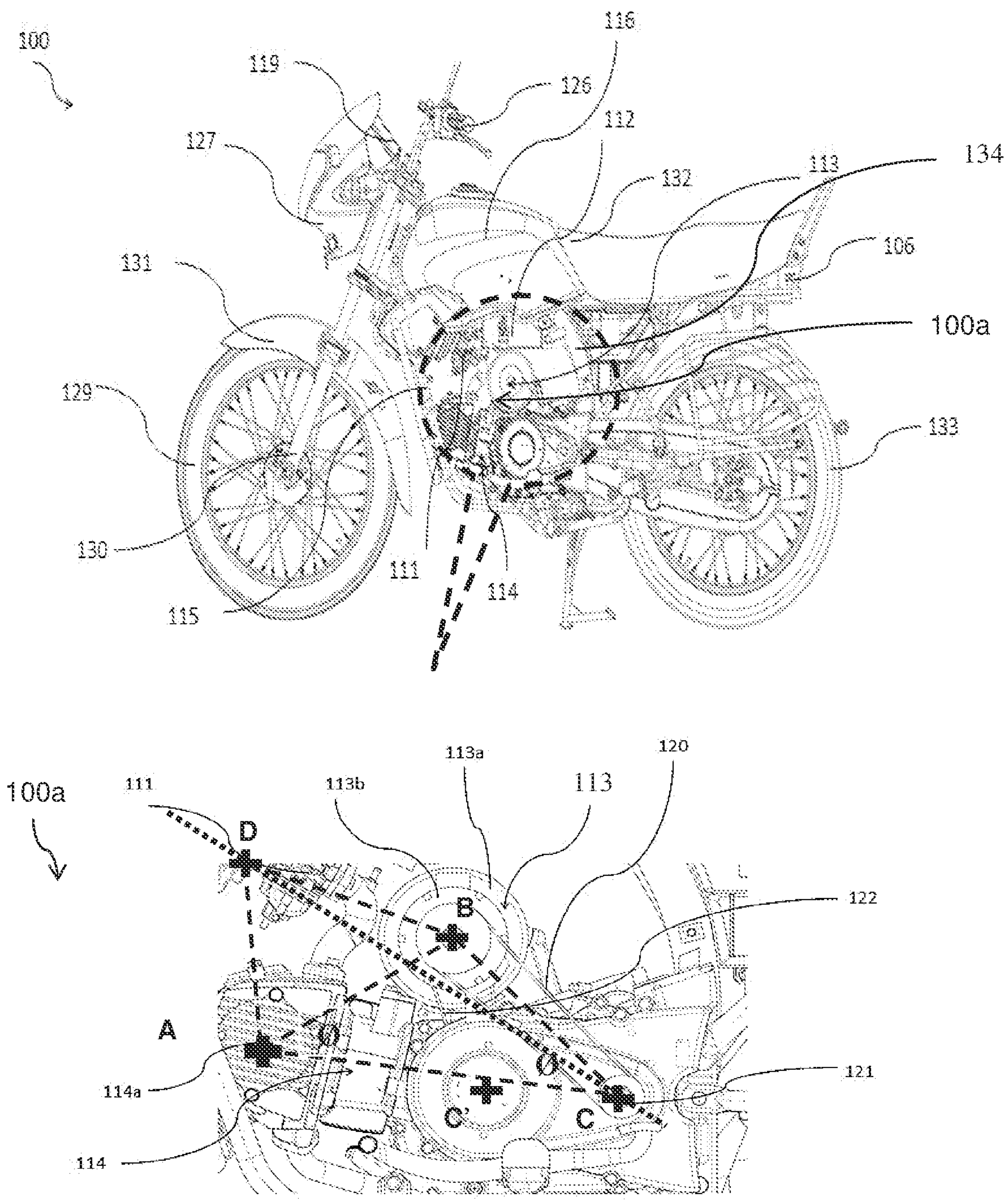
FIG. 1 is a side view of a saddle hybrid type vehicle as per one embodiment of the present invention.

The arena of technology pertaining to transportation has undergone a tremendous transformation over the years, such that the present concentration is focused upon the efficiency and cost of manufacturing, which includes the cost of materials, assembly cost, cost of inventory handling etc. Simultaneously, there has also been need in the industry to provide stronger, lighter and economically advantageous vehicles that consume less power. Electric power storage device driven vehicles happen to be eco-friendly, in line with the Go Green initiative of various organizations. These vehicles may be two, three or four wheelers depending upon the requirement of the consumer and have multiple applications.

In automobile vehicle industry, electric vehicles are introduced to control air pollution caused due to IC engine powered vehicles. Currently, the electric vehicles are classified into two groups, namely pure electric and extended electric vehicles (also known as hybrid vehicles). The hybrid vehicles have a primary electric drive with associated energy storage unit and an internal combustion engine coupled to an electric motor/generator.

Further, there are two types of electric hybrid vehicle concepts, i.e., series and parallel. In series hybrid, the wheels are driven solely by the electric motor, which is powered by either the energy storage unit or the IC engine-generator. The energy storage unit is charged by the generator and by regenerative braking. A series hybrid is essentially an electric vehicle with an on-board engine-generator for energy storage unit charging.

In the more sophisticated parallel hybrid, the wheels are driven by both the electric motor and the IC engine. Parallel hybrids are in effect a conventional IC automobile with electric assist. The electric system amplifies the power of the IC engine during acceleration and recovers energy in braking. In this sense the electric system acts like a supercharger to give a small IC engine the performance of a large one. A "strong" parallel hybrid is one in which the electric system can provide enough torque and power that the vehicle can be operated on electric power alone.

In recent years, electric vehicles (EV) have become quite popular due to high oil prices and the environmental impact of pure gasoline fuel consumption vehicles. Pure electric vehicles using electric motors as a driving source and hybrid electric vehicle (HEV) combine other driving sources such as an electric motor and an engine have been put to practical use. The above-mentioned automobile is equipped with an electrical component like energy storage unit, for supplying electric power as electric energy to an electric motor. In this particular type of vehicles, the vehicle's driving force is provided from an energy storage unit in order to receive the energy required for driving the vehicle. Generally, hybrid vehicles, configured to be powered either by an internal combustion engine or electric motor or both, are replacing normal engine powered vehicles. For example, driving on terrain or for long distances, an internal combustion engine can be used and for shorter distances electric propulsion system can be used. So, there is a constant need of EV/HEV saddle type vehicle, to decrease the pollution level in the atmosphere, but there exists a challenge to configure the additional components in the vehicle having conventional compact layout. Unlike in a vehicle with four or more wheels or multi-track vehicles, the size of the vehicle is large enough to package the required sub-system of an EV/BEV platform and powertrain unit. Also, such large vehicles have a low impact on the power to weight ratio in laden and unladen condition i.e. when carrying occupants. The challenge for a saddle type vehicle is rather opposite and complex. While the change in power to weight ratio is significant with laden condition, there is an additional contradictory requirement of designing a compact saddle vehicle with EV/HEV powertrain unit.

The below paragraphs disclose and layout of the conventional saddle type vehicle having power unit as an internal combustion engine which addresses above problems and other problems of known art. The layout of the saddle type vehicle is compact and is preferred mostly by riders for commercial and personal use. There are various types of saddle type vehicle like cruiser type vehicle, commuter type vehicle, touring type vehicle, off road type vehicle etc., among which the commuter type vehicle (referred here as saddle type vehicle) is most preferred among the customers because of its design and is well suited for plurality of purposes especially in developing countries. Further, the conventional layout of the saddle type vehicle having power unit as the internal combustion engine includes a frame assembly having a front zone and a rear zone. The front zone supports a steering assembly along with a front telescopic suspension of the vehicle. The front zone includes a main frame, a down frame and side frames which supports the vehicle parts including power unit. The rear zone includes a sub-frame that includes rear wheel, an induction system and a rear suspension assembly connected thereof. Therefore, the rear zone and front zone are subjected to various forces from the front and rear wheel through the suspension and from the power unit in addition to the payloads arising out the occupants & goods. Since the saddle type vehicle has space constraints, therefore incorporation of internal combustion engine, electric motor assembly and other related systems like induction system, transmission system etc. in the conventional layout of the saddle type vehicle makes the vehicle bulky and system more complex. In contrast, for example, a touring saddle type vehicle is larger, having elongated length and extended breadth, than any other types of saddle type vehicle. Therefore, in this type of vehicle, components like the internal combustion engines, electric motor assembly and other related systems like induction system, transmission system etc. can be easily incorporated without compromising with the space and length or wheelbase of the vehicle. Further, in an off road saddle type vehicle, which has seat height taller than any other types of saddle type vehicle, components like the internal combustion engines, electric motor assembly and other related systems like induction system, transmission system etc. can be easily incorporated. Hence, from above mentioned paragraph, it is apparent that there exists a challenge of achieving a compact layout of the saddle type vehicle, where the components like the internal combustion engines, electric motor assembly and other related systems like induction system, transmission system etc. need to be disposed in close proximity in a secure, safe manner while still being able to maintain the conventional length or shorter wheelbase and width of the saddle type vehicle to transform the conventional saddle type vehicle into the hybrid saddle type vehicle.

Typically, as per known art, a hybrid saddle type vehicle includes an inclined vertical engine; a motor is arranged on a vehicle center line to a drive gear on a counter shaft of the transmission mechanism via a deceleration mechanism. The motor is disposed offset to a clutch chamber (clutch mechanism). This leads to increased number of components for mounting the components. Further, an energy storage unit and an inverter are provided below a seat in the vehicle. The incorporation of these components in the hybrid saddle type vehicle is easily possible when the seat height is taller than any other types of saddle type vehicle, since there exist no space constraints in the vehicle.

Hence, there exists a contradictory challenge of securely mounting components like internal combustion engine, electric motor assembly, energy storage unit etc. in a compact hybrid saddle type vehicle, while ensuring safety and ease of assembly to the user having hybrid saddle type vehicles without any major change in conventional layout design and manufacturing set-up of the vehicle.

Therefore, there is a need to have an improved layout of the vehicle, for housing components like energy storage unit, an engine assembly, an electric motor assembly etc. which ensures the secured and compact packaging of these components in the vehicle while maintaining the conventional length or wheelbase and compact width of the vehicle.

The present invention provides a solution to the above problems while meeting the requirements of minimum modifications in a conventional saddle vehicle, at low cost with ease of assembly of the components.

With the above objectives in view, the present invention relates to the saddle type vehicle and more particularly to an improved mounting and layout configuration of components while ensuring the conventional length, small wheelbase and compact width of the vehicle.

As per one aspect of the present invention, the saddle type vehicle comprises a frame assembly, an internal combustion engine, an electric motor, an induction system, a transmission system. The frame assembly includes a head tube disposed in the front of a saddle type vehicle, a main frame extending from the head tube and extending gradually downwards towards the rear portion and takes a curve towards the bottom at the middle portion of the saddle type vehicle, commonly known as a centre frame. A pair of down frames extended backward after they are extended downward from the front of the main frame.

Further, as per one aspect of the present invention, the internal combustion engine (referred here as an engine assembly) is mounted to the pair of down frames in a horizontal direction with respect to the front side of the vehicle. A cylinder head of the engine assembly is mounted with the pair of down frames extending from the main frame with various attachment means like fasteners. Further, as per one aspect of the present invention, the cylinder head is attached to an induction system in the vehicle. The induction system is mounted at the initial part of the pair of down frames extended from the main frame and partially overlapped with a fuel tank mounted on the vehicle. This configuration ensures the flow of atmospheric air in the induction system and thus improves the air fuel in combustion stage of the engine assembly. Further, as per one aspect of the present invention, an energy storage unit is mounted at the centre frame with various attachment means like fasteners. The energy storage unit is placed inside a housing member, which ensures that the energy storage unit is securely placed in the vehicle. The energy storage unit provides power to the essential; components like electrical components, headlight etc. in the vehicle.

Further, as per one embodiment of the present invention, the vehicle includes an electric motor assembly, where the electric motor assembly includes an electric motor and electromagnetic clutch. The electromagnetic clutch is coaxially placed on the electric motor assembly. More precisely, the electromagnetic clutch is sandwiched between first belt drive and second belt drive in the vehicle. In another implementation, the first belt drive with the electromagnetic clutch can be mounted on other side of the electric motor assembly. Further, as per one aspect of the present invention, the electric motor assembly is disposed transversely above a crankcase of the engine assembly. The first belt drive is connected to a crankshaft of the engine assembly which ensures the working of the engine assembly when vehicle is in hybrid mode or during when the high speed is required by the user while riding the vehicle. Further, as per one aspect of the present invention, the second belt drive connects the electric motor and a drive shaft, where the second belt drive transfers output of the electric motor assembly to the drive shaft. The drive shaft is connected to a rear wheel of the vehicle with a chain drive. Further, the drive to the engine assembly for starting is provided by first belt drive which results into the starting of the motor, thereby leading to starting of the vehicle in EV mode and later as per requirement changes into hybrid mode.

Further, as per one aspect of the present invention, the vehicle also includes a one way clutch. The one way clutch allows rotation in one direction and instantly prevents force from being driven in the opposite direction. As per one aspect of the present invention, the one way clutch is mounted between the crankshaft of the engine assembly and a counter shaft. Further, as per another aspect of the present invention, the second one way clutch is mounted in the countershaft. Furthermore, as per another aspect of the present invention, the one way clutch is mounted in an engine output shaft between the drive shaft and chain sprocket.

Further "front" and "rear", and "left" and "right" referred to in the ensuing description of the illustrated embodiment refer to front and rear, and left and right directions as seen in a state of being seated on a seat of the vehicle and looking forward. Furthermore, a longitudinal axis refers to a front to rear axis relative to the vehicle, while a lateral axis refers generally to a side to side, or left to right axis relative to the vehicle.

The present invention is now described briefly in connection with the rendered drawings. It should be noted that like elements are denoted by the same reference numerals throughout the description.

In the ensuing exemplary aspects, the vehicle is a saddle type hybrid vehicle. However, it is contemplated that the concepts of the present invention may be applied to any of the two wheeler and three wheeler to achieve a compact layout.

FIG. 1 is a left side view of an exemplary saddle hybrid type vehicle as per one embodiment of present subject matter along with a local magnified view of the hybrid power unit assembled on the vehicle. The vehicle (100) has a frame assembly (not shown), which acts as the skeleton for bearing the loads. Instrument cluster (119) is mounted on handle bar assembly (126). The handle bar assembly (126) is pivotally disposed through the head tube where it includes brake levers (not labelled). The handle bar assembly (126) is connected to a front wheel (129) by one or more front suspension(s) (130). A front fender (131) is disposed above the front wheel (129) for covering at least a portion of the front wheel (129). A bracket (not shown) is mounted overhead of the front fender and extended on both sides of the front fender, which provides additional strength and stability to the front fender. The vehicle (100) has lighting means which includes Head lamp (127), Tail lamp (106), Turning indicators includes front side indicators (not labelled) and rear side indicator (not labelled) respectively. A rear wheel hugger (not shown) is mounted on the left side of swing arm and further, a license plate, license plate illuminator and a reflex reflector is mounted on the rear wheel hugger. A seat (132) is extended in a longitudinal direction along the seat frames.

As per one embodiment of the present invention, the vehicle (100) comprises of a compact layout configuration of a substantially horizontally disposed internal combustion engine assembly (114), an electric motor assembly (113) disposed substantially above the engine assembly (114), an induction system (111) disposed forward of the electric motor assembly (113) and above the engine assembly (114), a drive shaft (121) disposed towards the rear side of the engine assembly (114), a first belt drive (122) coupling the drive from the electric motor assembly (113) to the crankshaft assembly and a second belt drive (120) coupling the electric motor assembly (113) to the drive shaft (121). The electric motor assembly (113), engine assembly (114), drive shaft (122), the first belt drive (122) and the second belt drive (120) forms a part of hybrid power unit (100*a*). As per an aspect of the present invention, a compact layout configuration is achieved by disposing the camshaft axis (A), the electric motor assembly axis (B) and the drive shaft axis (C) along the 3 vertices of a triangle such that the line joining the camshaft axis (A) and drive shaft axis (C) substantially passes close to the crankshaft axis (C') thereby achieving a stable, compact and durable layout along with improved system response time. As per an embodiment of the present invention, the angles formed at axis A and C is acute angles and of substantially similar values Ø. Further, as per an aspect of the present invention, the induction system is disposed substantially at a locus point D which is disposed on the opposite side of the crankshaft axis C' with reference to line AB. As per another embodiment, the locus point D forms an equilateral triangle ABD to enable a compact layout. As per another aspect of the present invention, the line CD substantially bifurcates the layout into two regions, one region comprising the engine assembly and its major parts and other region comprising the electric motor assembly and its constituent parts. This layout also enables a balanced mass distribution of the systems such that the Centre of Gravity (CG) of the hybrid power unit is disposed within the triangle ABC resulting in better force balance, improved structural rigidity and enhanced handling behaviour of the vehicle. The frame assembly includes a head tube (not shown) disposed in the front of the vehicle, a main frame extending from the head tube and extending gradually downwards towards the rear portion wherein the frame takes a curve towards the bottom at the middle portion of the vehicle which is commonly known as a centre frame (134). A pair of down frames (115) extended backward after they are extended downward from the front of the main frame.

Further, as per one aspect of the present invention, the internal combustion engine assembly (114) is mounted to the pair of down frames in a horizontal direction with respect to ground plane. A cylinder head (114*a*) of the engine assembly (114) is mounted with the pair of down frames (115) extending from the main frame with various attachment means like fasteners. Further, as per one embodiment of the present invention, the cylinder head (114*a*) is attached to an induction system (111) in the vehicle, where the induction system (111) is mounted above the cylinder head (114*a*) for a substantially horizontally disposed engine assembly (114). The induction system (111) is mounted at the front portion of the pair of down frames (115) extended from the main frame and partially overlapped with a fuel tank (116) mounted on the vehicle. This configuration ensures the flow of atmospheric air in the induction system and thus improves the air fuel in combustion stage of the engine assembly. Further, as per one embodiment of the present invention, an energy storage unit (112) is mounted at the centre frame (134). The energy storage unit (112) is placed inside a housing member, which ensures that the energy storage unit is securely placed in the vehicle. The energy storage unit provides power to the essential; components like electrical components, headlight etc. in the vehicle.

Figure 1A:
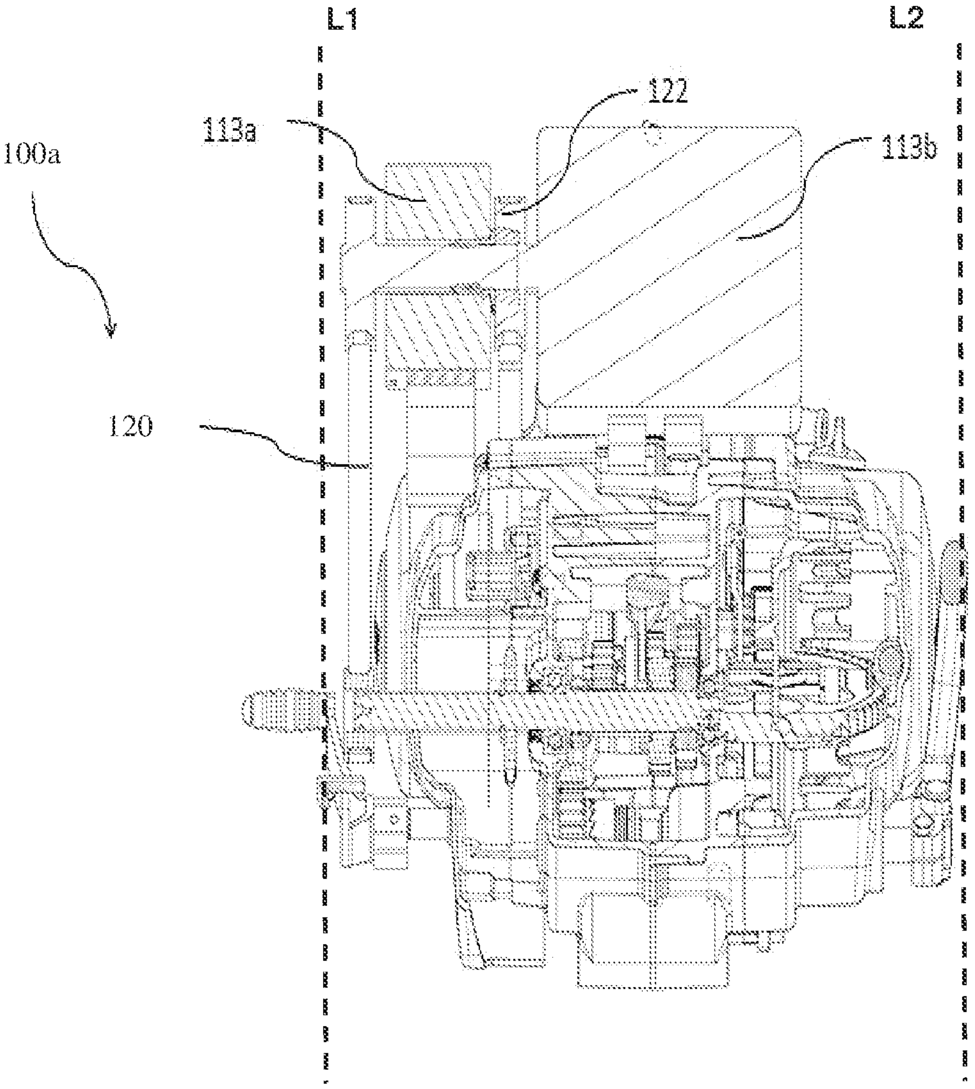
FIG. 1*a* is a sectional view of the hybrid power unit as per one embodiment of the present invention.
Figure 1B:
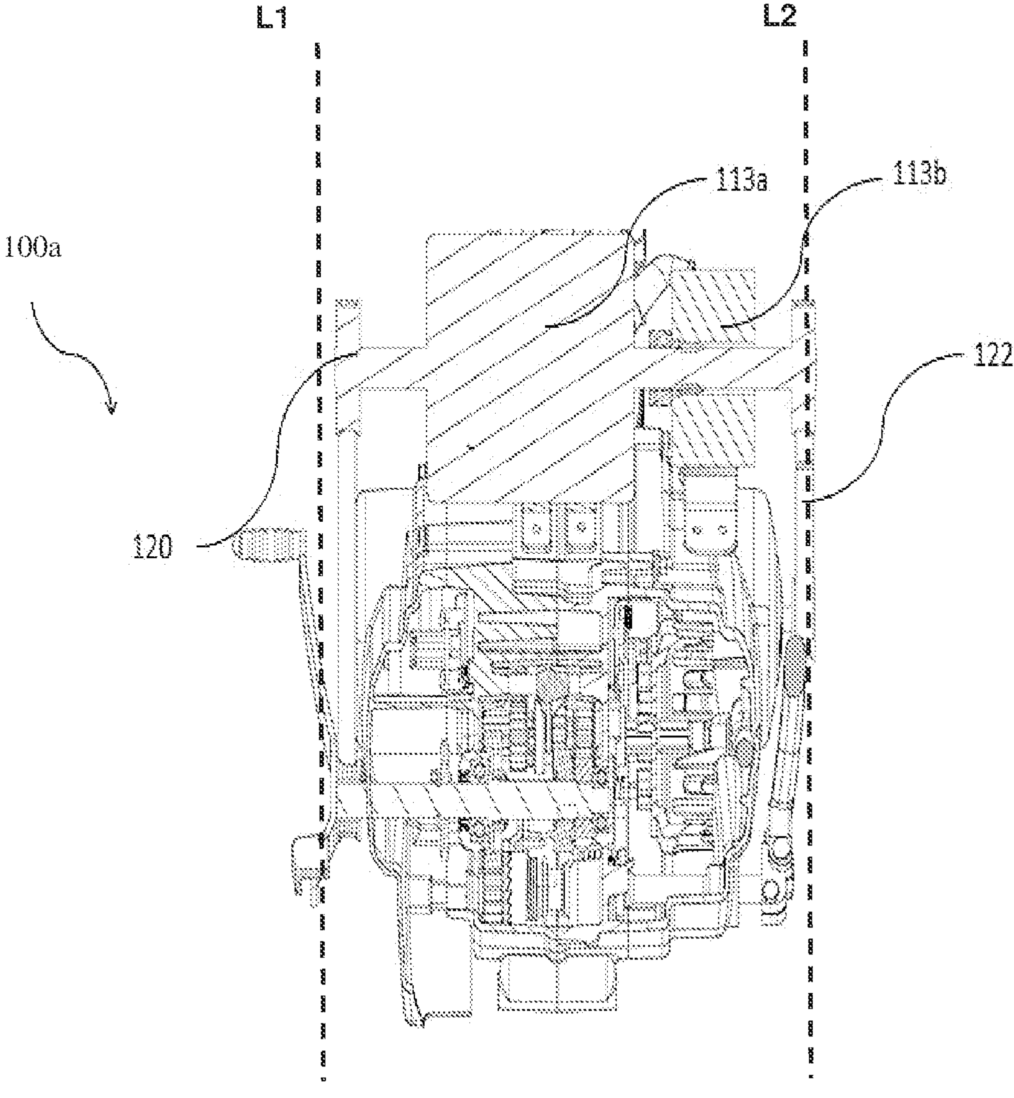
FIG. 1*b* is a sectional view of the hybrid power unit as per another embodiment of the present invention one embodiment of the present invention.

Further, as per one embodiment of the present invention, the vehicle includes an electric motor assembly (113). The electric motor assembly (113) includes an electric motor (113*a*) and an electromagnetic clutch (113*b*), where the electromagnetic clutch (113*b*) is coaxially placed on the electric motor (113*a*). More precisely, the electromagnetic clutch (113*b*) is sandwiched between a first belt drive (122) and a second belt drive (120) in the vehicle (as shown in FIG. 1*a*). This configuration ensures the ease of assembly of the components in the vehicle and also eliminates the need of additional housing member for the electromagnetic clutch. As per an aspect, a compact width is achieved by disposing the hybrid power unit within the lateral limits L1 and L2 of the engine assembly (114). In another implementation, the first belt drive (122) with the electromagnetic clutch (113*b*) can be mounted on other side of the electric motor assembly (113) (as shown in FIG. 1*b*). This configuration ensures the elimination of additional components for preventing leakage from the engine assembly as this configuration enables the drive of the crankshaft by the first belt drive that is disposed outside a cover crankcase while still achieving a compact lateral width by disposing all the elements of the hybrid power unit substantially within the lateral boundary limits L1 and L2. Moreover, as the vehicle works in both the electric mode and the hybrid mode, hence in electric mode, the electric motor is used for vehicle propulsion. The second belt drive (120) drives the drive shaft (121) and finally turns the rear wheel, where the rear wheel is connected to the drive shaft through chain sprocket (not shown). In electric mode, the first belt drive (122) is disengaged by the electromagnetic clutch located co axially on the electric motor in the vehicle. During the working of the components in the hybrid mode of the vehicle, after exceeding a threshold speed, the engine assembly is employed for vehicle propulsion by disengaging the electric motor (113*a*) with the help of the electromagnetic clutch (113*b*). During the starting of the engine, the engine assembly (114) is started by the first belt drive (122) through the electromagnetic clutch (113*b*). After starting the engine assembly (114) through first belt drive (122), electromagnetic clutch is disengaged again. In this mode, electric motor can be used in the regeneration purpose to operate as a generator for charging purpose.

Further, since the electromagnetic clutch is placed adjoining the electric motor, it is easier to control the output of the electromagnetic clutch than when it is located elsewhere in the vehicle. For example, this layout helps in quick engagement of the clutch and starting the engine assembly, thereby easily controlling the torque and the speed transmitted through the first belt drive to a crankshaft. Let us take for an example, placing the electromagnetic clutch far away from the motor would have caused time delay to start the engine assembly (e.g., in the order of 100 to 200 milliseconds). Thus, when the vehicle is running, for example, in an electric mode, and the rider is attempting to change to other mode, the response time to convert to the other mode should be quicker, and any time delay as explained above would be detrimental leading to sluggish system response which is undesirable. As the changing of electric mode to the other mode is typically performed where higher acceleration response is expected, for instance while overtaking, this is achieved by the compact layout configuration of the present invention, thereby achieving the expected acceleration.

Further, as per one embodiment of the present invention, the electric motor assembly (113) is disposed transversely above a crankcase of the engine assembly (114) and a shaft of the electric motor (113*a*) is protruded in left hand side of the vehicle. The first belt drive (122) is connected to the crankshaft of the engine assembly (114) which ensures the working of the engine assembly when vehicle is in hybrid mode or when the high speed and/or high torque are required by the user while riding the vehicle. Further, as per one embodiment of the present invention, the second belt drive (120) connects the electric motor (113*a*) and the drive shaft (121), where the second belt drive transfers output of the electric motor assembly to the drive shaft. The drive shaft is connected to a rear wheel of the vehicle with a chain drive. Further, the drive to the engine assembly for starting is provided by first belt drive, thereby leading to starting of the vehicle in the mode as required by the users or as determined by a controller.

Figure 2:
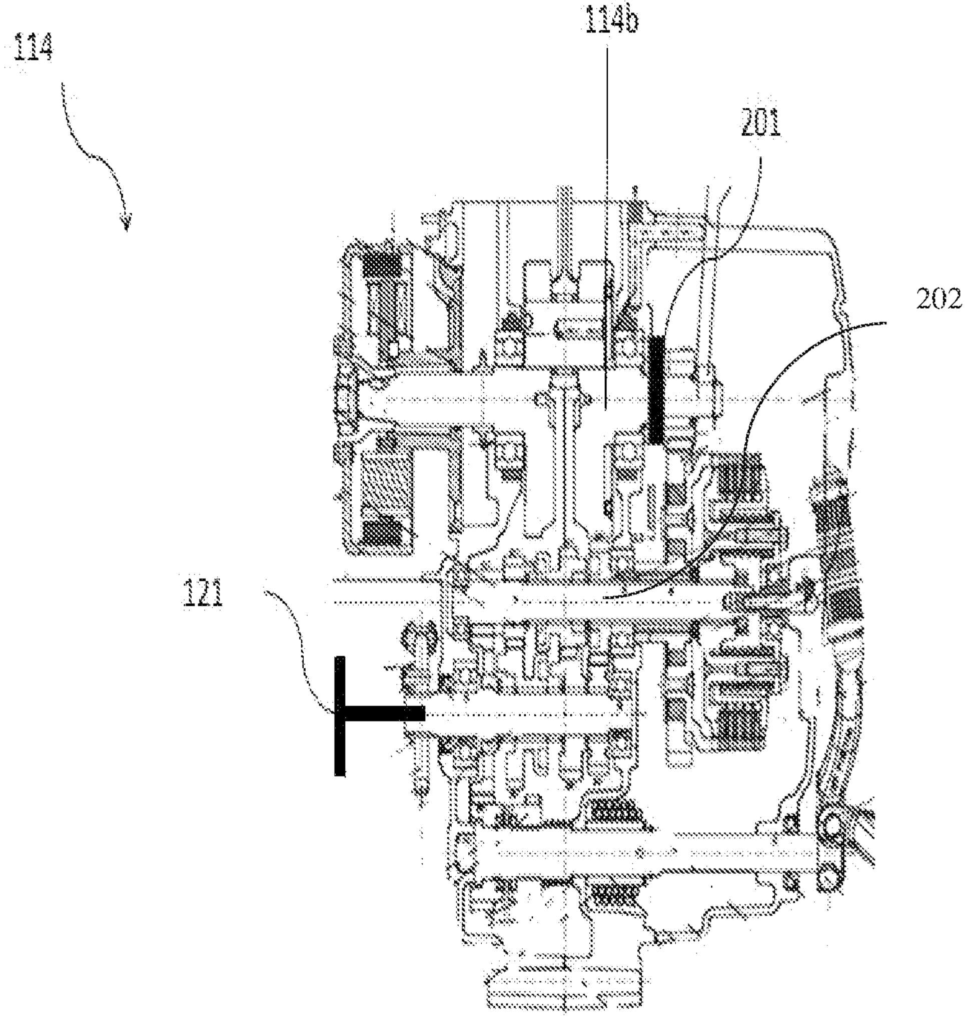
FIG. 2 is a sectional view of an engine assembly having one way clutch in crankshaft as per one embodiment of the present invention.
Figure 2A:
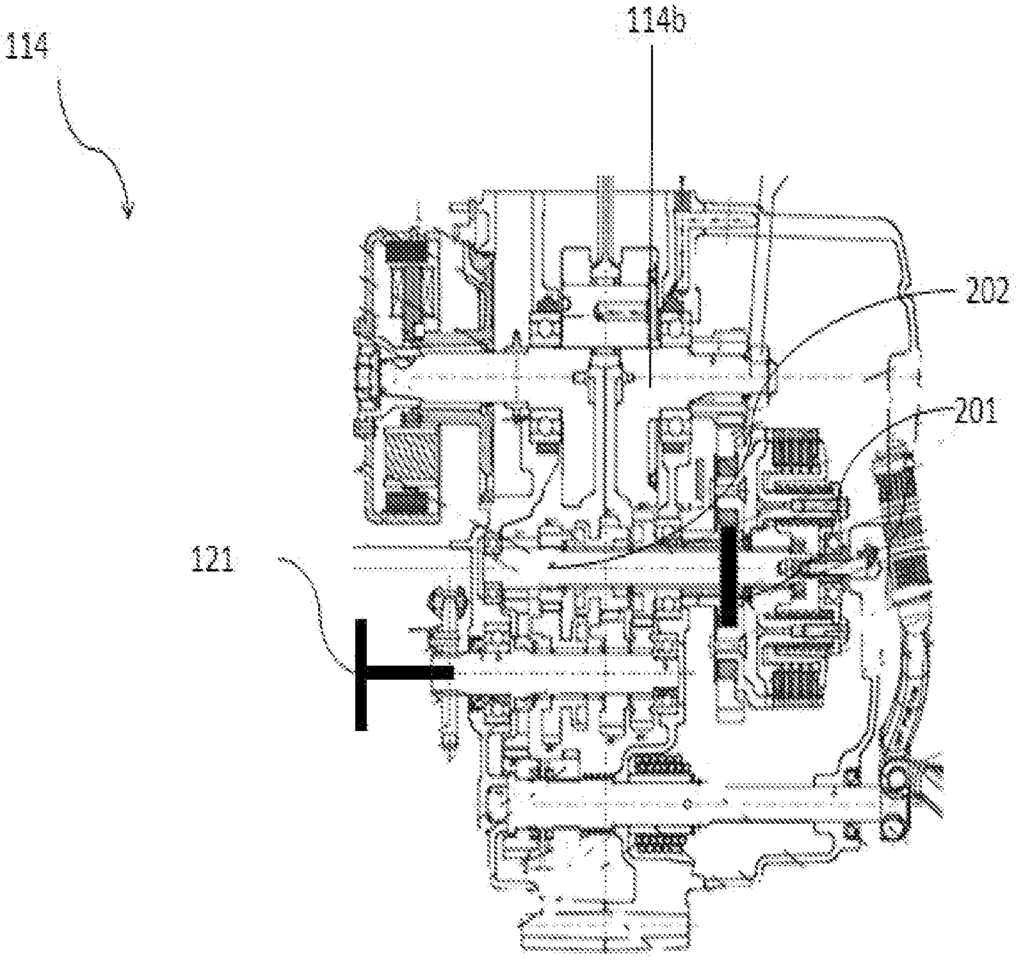
FIG. 2*a* is a sectional view of an engine assembly having one way clutch in countershaft as per another embodiment of the present invention.
Figure 2B:
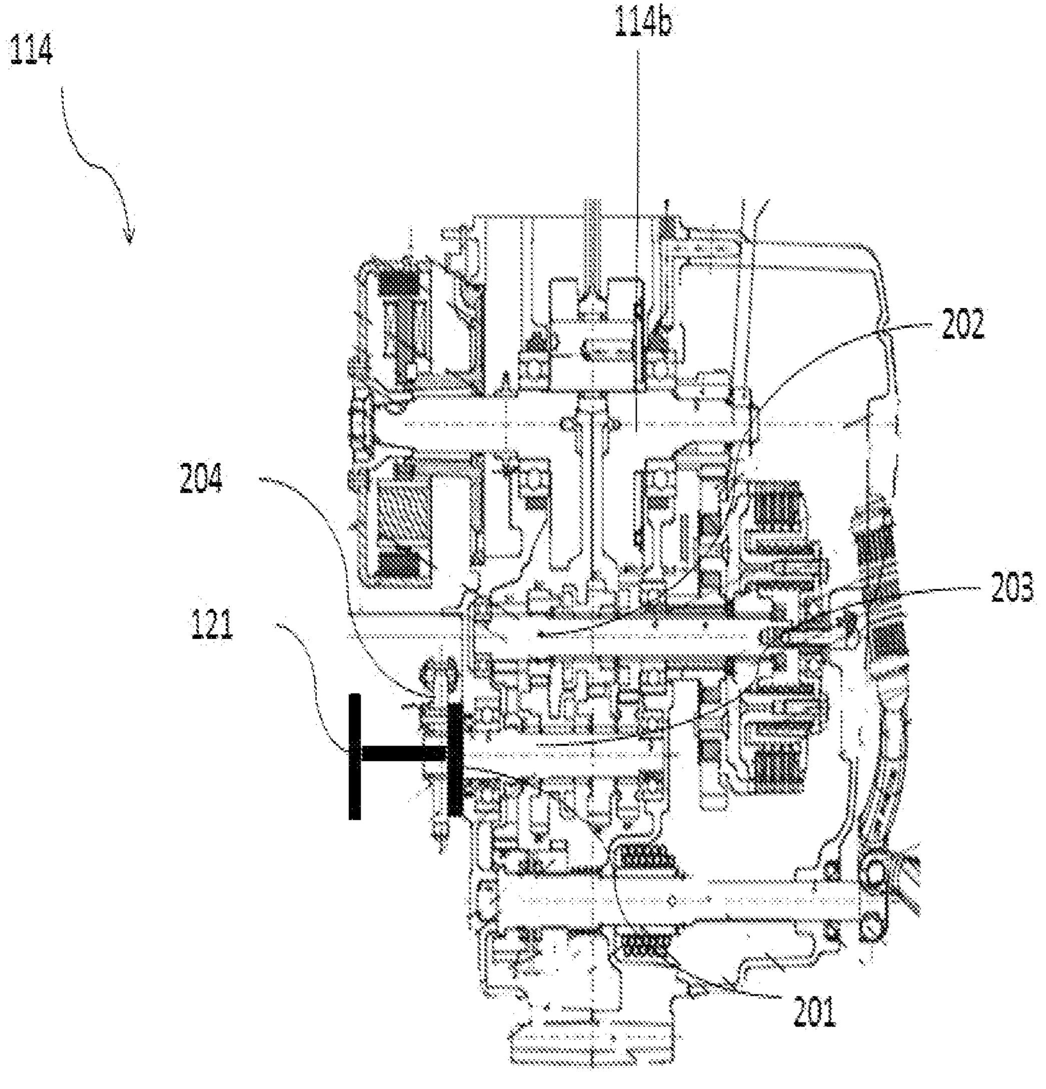
FIG. 2*b* is a sectional view of an engine assembly having one way clutch as per another embodiment of the present invention.

FIG. 2, FIG. 2*a* and FIG. 2*b* are a sectional view having one way clutch as per an embodiment of the present invention. Further, as per one embodiment of the present invention, the vehicle also includes a one way clutch (201). The one way clutch allows rotation in one direction and instantly prevents force from being driven in the opposite direction. As per one embodiment of the present invention, the one way clutch (201) is mounted between the crankshaft (114*b*) of the engine assembly (114) and a counter shaft (as shown in FIG. 2), ensuring restriction of movement of the crankshaft during braking and thereby prevents unnecessary engine assembly deceleration. Further, as per another embodiment of the present invention, the one way clutch is mounted on the countershaft (202) (as shown in FIG. 2*a*). Furthermore, as per another embodiment of the present invention, the one way clutch is mounted in an engine output shaft (203) between the drive shaft and chain sprocket (as shown in FIG. 2*b*). Basically, the one way clutch as disposed in the different locations in the 3 different layout configurations of the vehicle, disengages engine assembly from the wheel during deceleration of the vehicle or during the electric mode of the vehicle.

The invention helps in overcoming the problem of space constraint in the vehicle while ensuring ease of assembly of the components in the vehicle while maintaining the conventional layout of the vehicle that is length and width of the vehicle and ultimately makes it cost effective. Additionally, the layout configuration as per present invention enables compact dimensions, packaging, centralized mass and CG distribution, enhanced riding performance and faster system response time.

Advantageously, the embodiments of the present invention, describes the potential modifications in the securely mounting of the components in the hybrid vehicle.

Many other improvements and modifications may be incorporated herein without deviating from the scope of the invention.

LIST OF REFERENCE SYMBOL

FIG. 1

100: Saddle type Vehicle
126: Handle Bar Assembly
119: Instrument Cluster
127: Head Lamp
131: Front Fender
129: Front Wheel
130: Front Suspension
134: Housing Member
115: A pair of down frames
114: Engine Assembly
116: Fuel Tank
112: Energy storage unit
132: Seats
113: Electric Motor Assembly
113*a*: Electric Motor.

113*b*: Electromagnetic Clutch
120: Second belt drive
121: Drive Shaft
122: First belt drive
114*a*: Cylinder Head
134: Centre Frames.
106: Tail Lamp
133: Rear Wheel
100*a*: Hybrid Power Unit

FIG. 2

201: One way Clutch
114*b*: Crankshaft.

FIG. 2*a*

202: Countershaft

FIG. 2*b*

203: Engine Output Shaft
204: Chain Sprocket

We claim:

1. A hybrid vehicle, comprising:

an engine assembly that is horizontally disposed along a longitudinal direction of the hybrid vehicle and includes a cylinder head, an engine output shaft, and a crankshaft; and an electric motor assembly that is transversely disposed above the engine assembly, a first belt drive, and a second belt drive, wherein the electric motor assembly includes an electric motor and an electromagnetic clutch that is mounted coaxially on the electric motor, the first belt drive is configured to connect the electric motor and the crankshaft, and the second belt drive is configured to connect the electric motor and a drive shaft in the hybrid vehicle.

2. The hybrid vehicle as claimed in claim 1, further comprising a one way clutch disposed on the crankshaft of the engine assembly.

3. The hybrid vehicle as claimed in claim 1, further comprising a one way clutch disposed on a countershaft in the hybrid vehicle.

4. The hybrid vehicle as claimed in claim 1, further comprising a one way clutch disposed on the engine output shaft of the engine assembly.

5. The hybrid vehicle as claimed in claim 1, further comprising a fuel tank, wherein the induction system is partially overlapped with the fuel tank in the hybrid vehicle.

6. The hybrid vehicle as claimed in claim 1, further comprising an energy storage unit mounted on a centre frame in the hybrid vehicle.

7. A hybrid power unit for a hybrid vehicle, the hybrid power unit comprising:

an engine assembly having a camshaft axis (A) and horizontally disposed along a longitudinal direction of the hybrid vehicle;

an electric motor assembly having an electric motor assembly axis (B) and transversely disposed above the engine assembly, a first belt drive, and a second belt drive; and a drive shaft having a drive shaft axis (C), wherein the electric motor assembly includes an electric motor and an electromagnetic clutch that is mounted coaxially on the electric motor, the first belt drive is configured to connect the electric motor assembly and the engine assembly, the second belt drive is configured to connect the electric motor assembly and the drive shaft, and the camshaft axis (A), the electric motor assembly axis (B), and the drive shaft axis (C) are disposed along three vertices of a triangle where a line joining the camshaft axis (A) and the drive shaft axis (C) substantially passes close to a crankshaft axis (C') of the engine assembly.

8. The hybrid power unit for a hybrid vehicle as claimed in claim 7, wherein two interior angles of the triangle at two of the vertices passing the camshaft axis (A) and the drive shaft axis (C) are acute angles and of substantially similar values Ø.

9. The hybrid power unit for a hybrid vehicle as claimed in claim 7, wherein the hybrid vehicle includes an induction system, the induction system is disposed at the locus point (D).

10. The hybrid power unit for a hybrid vehicle as claimed in claim 7, wherein the hybrid vehicle includes a fuel tank and an energy storage unit, wherein the energy storage unit is disposed below the fuel tank and above the hybrid power unit.

11. The hybrid power unit for a hybrid vehicle as claimed in claim 7, further comprising a first belt drive and a second belt drive, wherein the first belt drive couples a drive from the electric motor assembly to a crankshaft of the engine assembly and a second belt drive couples the electric motor assembly to the drive shaft.

* * * * *